(12) United States Patent
Chen

(10) Patent No.: US 12,532,317 B2
(45) Date of Patent: Jan. 20, 2026

(54) INTER-UE COORDINATION FOR ENHANCEMENT OF SIDELINK COMMUNICATIONS

(71) Applicant: MediaTek Singapore Pte. Ltd., Singapore (SG)

(72) Inventor: Tao Chen, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 348 days.

(21) Appl. No.: 17/956,823

(22) Filed: Sep. 30, 2022

(65) Prior Publication Data

US 2023/0094330 A1 Mar. 30, 2023

(30) Foreign Application Priority Data

Sep. 27, 2022 (CN) .......................... 202211186373.3

(51) Int. Cl.
*H04W 72/04* (2023.01)
*H04W 72/10* (2009.01)
*H04W 72/20* (2023.01)
*H04W 72/56* (2023.01)

(52) U.S. Cl.
CPC ........... *H04W 72/20* (2023.01); *H04W 72/56* (2023.01)

(58) Field of Classification Search
CPC ..... H04W 72/02; H04W 72/20; H04W 72/56; H04W 76/14
See application file for complete search history.

(56) References Cited

U.S. PATENT DOCUMENTS

| 12,185,341 B2 * | 12/2024 | Hwang | H04W 72/02 |
| 2021/0219268 A1 * | 7/2021 | Li | H04B 17/318 |
| 2021/0250919 A1 | 8/2021 | Wang et al. | |
| 2022/0094466 A1 * | 3/2022 | Uchiyama | H04L 1/1812 |
| 2022/0303956 A1 * | 9/2022 | Hong | H04W 4/40 |
| 2022/0322302 A1 * | 10/2022 | Park | H04W 72/20 |
| 2022/0361185 A1 * | 11/2022 | Sarkis | H04L 5/0055 |
| 2022/0361196 A1 * | 11/2022 | Sarkis | H04W 72/569 |
| 2022/0417919 A1 * | 12/2022 | Shin | H04W 72/40 |
| 2023/0090749 A1 * | 3/2023 | Hwang | H04W 72/25 370/329 |

(Continued)

FOREIGN PATENT DOCUMENTS

| KR | 20230043941 A * | 3/2023 | ............ H04W 72/02 |
| WO | WO 2021155527 A1 | 8/2021 | |

OTHER PUBLICATIONS

European Patent Office, Extended European Search Report for European Patent Application No. 22198754.8, Jan. 23, 2023.

(Continued)

*Primary Examiner* — Wutchung Chu
(74) *Attorney, Agent, or Firm* — Andy M. Han; Han IP PLLC

(57) ABSTRACT

Various examples and schemes pertaining to inter-user equipment (UE) coordination for enhancement of sidelink (SL) communications are described. A first UE transmits a first message via sidelink control information (SCI) signaling to a second UE. In response to the transmitting, the first UE receives a second message from the second UE. Then, the first UE transmits data using a resource derived based on a preferred resource indicated by inter-UE coordination information in the second message.

14 Claims, 5 Drawing Sheets

(56) References Cited

U.S. PATENT DOCUMENTS

| | | | | |
|---|---|---|---|---|
| 2023/0137259 A1* | 5/2023 | Hwang | ............... | H04W 72/121 |
| | | | | 370/329 |
| 2023/0217468 A1* | 7/2023 | Hui | ...................... | H04W 72/25 |
| | | | | 370/329 |
| 2023/0262737 A1* | 8/2023 | Wang | ................... | H04W 72/25 |
| | | | | 370/329 |
| 2023/0337171 A1* | 10/2023 | Baek | ..................... | H04W 64/00 |
| 2023/0403728 A1* | 12/2023 | Hwang | ................ | H04W 72/40 |
| 2024/0040559 A1* | 2/2024 | Sarkis | ................... | H04W 72/20 |
| 2024/0073930 A1* | 2/2024 | Khoryaev | ............. | H04W 72/20 |
| 2024/0172185 A1* | 5/2024 | Hong | ................... | H04W 72/25 |
| 2024/0172251 A1* | 5/2024 | Hong | ..................... | H04W 4/40 |
| 2024/0244586 A1* | 7/2024 | Hong | ..................... | H04W 4/40 |
| 2024/0260064 A1* | 8/2024 | Leon Calvo | .......... | H04W 76/14 |
| 2024/0373442 A1* | 11/2024 | Shin | ..................... | H04W 72/40 |

OTHER PUBLICATIONS

Sony, "Discussion on Inter-UE coordination for Mode 2 enhancements", 3GPP TSG RAN WG1 #106-e, R1-2106819, e-Meeting, Aug. 16-27, 2021.

ITL, "Inter-UE coordination for mode 2 enhancements", 3GPP TSG RAN WG1 #106-e, R1-2107994, e-Meeting, Aug. 16-27, 2021.

Taiwan Intellectual Property Office, Office Action in Taiwan Patent Application No. 111137208, Sep. 28, 2023.

\* cited by examiner

INTER-UE COORDINATION FOR ENHANCEMENT OF SIDELINK COMMUNICATIONS

CROSS REFERENCE TO RELATED PATENT APPLICATION(S)

The present disclosure claims the priority benefit of China Patent Application No. 202211186373.3, filed 27 Sep. 2022, which is part of a China national stage application of PCT Application No. PCT/CN2021/122211, filed 30 Sep. 2021. Contents of aforementioned applications are herein incorporate by reference in their entirety.

TECHNICAL FIELD

The present disclosure is generally related to wireless communications and, more particularly, to inter-user equipment (UE) coordination for enhancement of sidelink (SL) communications.

BACKGROUND

Unless otherwise indicated herein, approaches described in this section are not prior art to the claims listed below and are not admitted as prior art by inclusion in this section.

Under the $3^{rd}$ Generation Partnership Project (3GPP) specification for 5th Generation (5G) New Radio (NR), vehicle-to-everything (V2X) SL communications can be supported by unicast, groupcast and broadcast communications. Moreover, inter-UE coordination may be used to assist SL resource allocation for performance improvement. Regarding SL resource allocation, an assisted UE (e.g., a vehicle being assisted) may request one or more assisting UEs (e.g., one or more other vehicles assisting the assisted vehicle) to provide an inter-UE coordination message which can help the assisted UE in performing resource allocation. However, there remain certain issues that need to be addressed with respect to whether and how to send a request message, as the request message tends to be critical for latency, overhead and performance. Therefore, there is a need for a solution of inter-UE coordination for enhancement of SL communications.

SUMMARY

The following summary is illustrative only and is not intended to be limiting in any way. That is, the following summary is provided to introduce concepts, highlights, benefits and advantages of the novel and non-obvious techniques described herein. Selected implementations are further described below in the detailed description. Thus, the following summary is not intended to identify essential features of the claimed subject matter, nor is it intended for use in determining the scope of the claimed subject matter.

Under various proposed schemes in accordance with the present disclosure, a UE in need of assistance in resource allocation may request one or more other UEs to provide information about one or more preferred time and/or frequency resources for transmission. Such request may be realized by a physical sidelink feedback channel (PSFCH)-based physical channel, a first sidelink control information ($1^{st}$ SCI) signal and/or a second SCI ($2^{nd}$ SCI) signal in two-stage SCI signaling-based SL control information, and/ or medium access control (MAC) control element (CE)-based physical data channel. A container for the request may be selected depending on the contents of the request and quality of service (QoS) requirement (e.g., depending on requirements on latency, congestion control, and the like). The request may be sent via one or more (pre-)configured resources. Moreover, the resource(s) used for transmission of the request may be SL pair specific (e.g., derived based on identifications (IDs) of both the assisted UE and an assisting UE).

In one aspect, a method may involve a first UE transmitting a first message via sidelink control information (SCI) signaling to a second UE. The method may also involve the first UE receiving a second message from the second UE responsive to transmitting the first message. The method may further involve the first UE transmitting data using a resource derived based on a preferred resource indicated by inter-UE coordination information in the second message.

In another aspect, a method may involve a second UE receiving a first message via SCI signaling from a first UE. The method may also involve the second UE transmitting a second message to the first UE responsive to receiving the first message, with the second message including inter-UE coordination information indicating a preferred resource, and wherein a resource derived based on the preferred resource is usable by the first UE to transmit data.

In yet another aspect, an apparatus implementable in a first UE may include a transceiver configured to communicate wirelessly and a processor coupled to the transceiver. The processor may transmit, via the transceiver, a first message via SCI signaling to a second UE. The processor may also receive, via the transceiver, a second message from the second UE responsive to transmitting the first message. The processor may further transmit, via the transceiver, data using a resource derived based on a preferred resource indicated by inter-UE coordination information in the second message.

It is noteworthy that, although description provided herein may be in the context of certain radio access technologies, networks and network topologies such as 5G/NR V2X, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Wireless Fidelity (Wi-Fi) and any future-developed networking and communication technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to inter-UE coordination for enhancement of SL communications. According to the present disclosure, a number of possible solutions or schemes may be implemented separately or jointly. That is, although these possible solutions/schemes may be described below separately, two or more of these possible solutions/schemes may be implemented in one combination or another.

Figure 1:
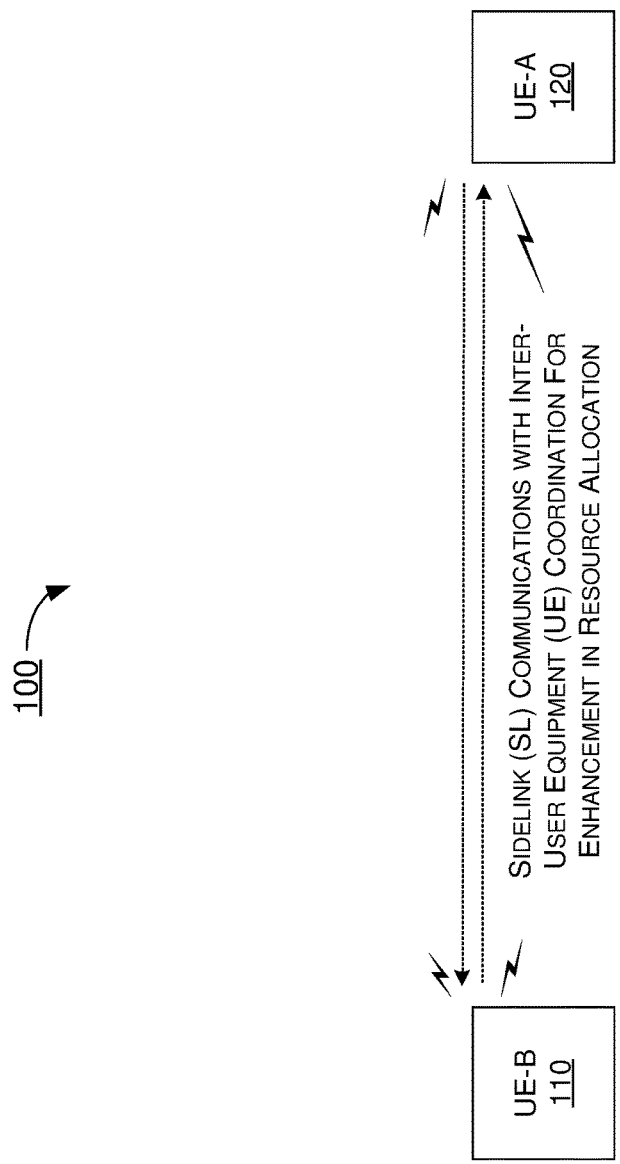
FIG. 1 is a diagram of an example communication environment in which various proposed schemes in accordance with the present disclosure may be implemented.

FIG. 1 illustrates an example communication environment 100 in which various solutions and schemes in accordance with the present disclosure may be implemented. FIG. 2~FIG. 5 illustrate examples of implementation of various proposed schemes in communication environment 100 in accordance with the present disclosure. The following description of various proposed schemes is provided with reference to FIG. 1~FIG. 5.

FIG. 1 illustrates an example communication environment 100 in which various solutions and schemes in accordance with the present disclosure may be implemented. Referring to FIG. 1, communication environment 100 may involve a first UE 110 (herein interchangeably referred to as "UE-B") in wireless communication (e.g., SL communication based on a 3GPP NR V2X specification) with a second UE 120 (herein interchangeably referred to as "UE-A"). In communication environment 100, UE-B and UE-A may implement various schemes pertaining to inter-UE coordination for enhancement of SL communications in accordance with the present disclosure, as described below. It is noteworthy that, in the context of present disclosure, one of UE-A and UE-B may be a requesting UE that sends a request to be assisted (hence interchangeably referred to as an "assisted UE" herein) while the other of UE-A and UE-B may be a peer UE that receives and responds to the request to provide assistance (hence interchangeably referred to as an "assisting UE", "receiving UE" or "responding UE" herein).

Figure 2:
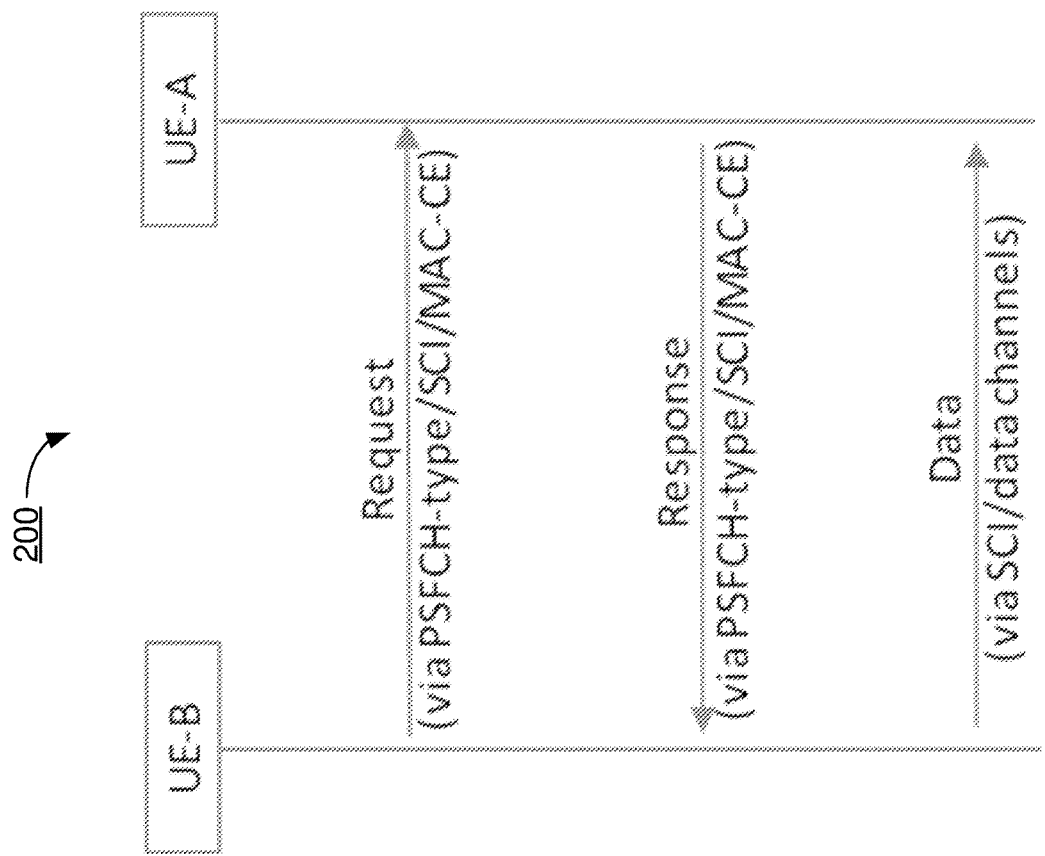
FIG. 2 is a diagram of an example scenario in accordance with an implementation of the present disclosure.

FIG. 2 illustrates an example scenario 200 of a procedure performed by UE-B and UE-A in accordance with the present disclosure. In scenario 200, UE-B may send a request message via a PSFCH-based physical channel, SCI or MAC-CE to UE-A. Upon reception of the request message, UE-A may provide a response message to UE-B with inter-UE coordination information on one or more preferred resources via the PSFCH-based physical channel, SCI or MAC-CE. UE-B may derive or otherwise determine the resource(s) to be used for transmission based on: (i) the preferred resource(s) indicated by UE-A in the response and (ii) UE-B's own sensing results for data transmission, and then UE-B may use the derived/determined resource(s) for data transmission. Alternatively, UE-B may use the preferred resource(s) indicated by UE-A directly for data transmission.

Under a proposed scheme in accordance with the present disclosure, a requesting/assisted UE (e.g., UE-B) may send a request to one or more receiving/peer/assisting UEs (e.g., UE-A) to request the assisting UE(s) to provide inter-UE coordination information about one or more preferred resources that may be used by the assisted UE for data transmission. In some implementations, such a request message be transmitted via a PSFCH-based physical channel. The PSFCH-based physical channel may be sequence-based physical channel. One PSFCH resource (e.g., one time and/or frequency and/or sequence resource) may be used for sending the request for a uni-directional or bi-directional SL connection. In some implementations, the PSFCH resource(s) for transmission of the request may be selected from a PSFCH resource set which may be (pre-)configured per bandwidth part (BWP) or per resource pool. The resources in the PSFCH resource set for transmission of the request may be ordered in time (e.g., at slot level), in frequency (e.g., at resource block (RB) level) and/or at a sequence level. For example, in the time domain, the PSFCH resource(s) for transmission of the request may be (pre-)configured, e.g., one occasion every N slots with N being a positive integer. Each occasion may correspond to one or more (pre-)configured symbol(s) in a slot, e.g., symbol#12 and symbol#13 in a slot. That is, symbol#12 and symbol#13 may be repeated for transmission of the request. The first symbol, e.g., symbol#12, may also be used to assist an automatic gain control (AGC) operation in a receiving UE (e.g., the one or more assisting UEs).

Under a proposed scheme in accordance with the present disclosure, the requesting/assisted UE (e.g., UE-B) may be (pre-)configured to send the request based on a certain condition (e.g., buffer status, packet arrival, packet high priority, UE capability and peer UE capability to support this feature). Each peer/receiving/assisting UE may indicate its capability. Alternatively, or additionally, each peer/receiving/assisting UE may provide the configuration via PC5-radio resource control (RRC) signaling or a field in a $1^{st}$ SCI signal and/or a $2^{nd}$ SCI signal in two-stage SCI signaling and to indicate that it cannot receive the request message. Moreover, transmission of the request by the requesting/assisted UE may be enabled/disabled by the peer UE via PC5-RRC signaling or the field in a $1^{st}$ SCI signal and/or a $2^{nd}$ SCI signal in two-stage SCI signaling.

Under a proposed scheme in accordance with the present disclosure, a maximum number of repetitions for transmission of the request may be (pre-)configured per BWP or per resource pool for the requesting UE. For repetitions of the request, the requesting UE may change the resource(s) used for the request per repetition, e.g., by changing the time/frequency/sequence resources for repetitions of transmission the request. The change of the resources may be determined based on a function of the number of repetitions and/or a pre-defined pattern. For example, a first or initial transmission may be performed on resource 1 and a second transmission may be performed on resource 2. A difference between resource 1 and resource 2 may be determined by an offset between the resources in time/frequency/sequence domain and/or the IDs for UEs transmitting/receiving the request. Such offset or pattern may be (pre-)configured. Alternatively, the offset may be randomly selected (e.g., by the requesting UE).

Under a proposed scheme in accordance with the present disclosure, in case of selection of one or a few resources (for transmission of requests to one or more other UEs) from a set of requests due to restriction of UE capability, the requesting UE may select one or more resources for the transmission of the request(s) corresponding to the traffic or packets with the highest priorities and/or the packets with the smallest (remaining) delay budgets.

Under a proposed scheme in accordance with the present disclosure, in case of collision of the request transmission(s) with transmission(s) and/or reception(s) of data or control channel, a prioritization rule may be applied. For example, the priority of the request may be determined or derived based on the priority of the packet to be transmitted (over the preferred resource(s) derived or indicated in a corresponding response message). Then, the priority of the request transmission may be compared with a priority threshold and/or the priority of one or more other channels to determine which transmission or reception should be prioritized or dropped. Alternatively, the priority of the request may be (pre-)configured or (pre-)defined by default, especially in cases where there is no associated data for transmission. For instance, the priority of a request message carrying a SCI field may be determined as follows: (i) in case that the request message is transmitted without multiplexing with data, the priority may be (pre-)configured or (pre-)defined; and (ii) in case that the request message is transmitted with multiplexing with data, the higher priority between the priority of the data and the (pre-)configured/(pre-)defined request priority may be taken.

Additionally, a UE (e.g., the requesting UE) may be (pre-)configured with multiple resource sets for transmission of the request. Each resource set of the multiple resource sets may be associated with a respective priority level among different priority levels. Thus, the requesting UE may select one of the resource sets according to the priority of the packet to be transmitted on the resources derived from the corresponding response message triggered by the request.

Under a proposed scheme in accordance with the present disclosure, the requesting UE may be provided, e.g., by sl-Request-Period, a number of slots in a resource pool for a period of request transmission occasion resources. In case that the number of slots is zero, request transmissions from the requesting UE in the resource pool may be disabled. Under the proposed scheme, the requesting UE may be indicated by one or more higher layers (e.g., via RRC signaling) to refrain from transmitting a request (e.g., not to transmit a request signaling). For instance, UE-B may send an explicit request for inter-UE coordination information and upon receiving the explicit request from UE-B, UE-A may send inter-UE coordination information to UE-B, and this feature may be enabled or disabled or controlled by (pre-)configuration.

Additionally, the requesting UE may be triggered, e.g., by sl-Request-StartOffset, to determine the starting occasion resources within sl-Request-Period. That is, the number of starting occasion resources may be counted based on available slots or physical slots. For example:

if (slotNumber mod sl-Request-Period)=sl-Request-
       StartOffset, then slotNumber is the occasion for
       the request transmission.

Alternatively, the occasion(s) for the request transmission may be determined or derived based on the IDs of the UEs involved in transmitting and/or receiving the request. For example, the requesting UE may determine a slot index of a resource for transmission of the request as follows:

$$(Tx\_id + Rx\_id) \bmod \text{sl-Request-Period}.$$

Herein, Tx_id denotes an ID of the requesting UE that is transmitting the request and Rx_id denotes an ID for peer UE that is receiving the request.

Under a proposed scheme in accordance with the present disclosure, for PSFCH-based request transmission, a requesting UE may expect that a slot $t'^{SL}_k$ ($0 \le k < T'_{max}$) has a PSFCH-based request transmission occasion resource in case of k mod $N_{Request}^{PSFCH}$ is a number of slots for SL transmission that belong to the resource pool within a certain period of time, e.g., 10240 msec, and $N_{Request}^{PSFCH}$ may be provided by sl-Request-Period. It is noteworthy that there may or may not be sl-Request-StartOffset in this case.

Under the proposed scheme, for a PSFCH-based request transmission, the requesting UE may be provided, e.g., by sl-PSFCH-Request-RB-Set, a set of $M_{Request, PRB, set}^{PSFCH}$ PRBs in a resource pool or BWP for the PSFCH-based request transmission in a physical resource block (PRB) of the resource pool or BWP. The starting PRB in the resource pool or SL BWP and the number of PRBs may be (pre-)configured for the requesting UE to determine the set of PRBs for transmission of request(s). Under the proposed scheme, a second orthogonal frequency-division multiplexing (OFDM) symbol l' of the PSFCH-based request transmission in a slot may be defined as l=startSLsymbols+lengthSLsymbols−2, especially in cases where only a part of the symbols in the slot is available for SL transmission.

Under a proposed scheme in accordance with the present disclosure, the requesting UE may determine a number of PSFCH resources available for multiplexing a request message in a PSFCH-based transmission as $R_{Request, PRB, CS}^{PSFCH} = M_{Request, subet, set}^{PSFCH} \cdot N_{CS}^{PSFCH}$, where $N_{CS}^{PSFCH}$ denotes a number of cyclic shift (pairs) for the resource pool or BWP provided by sl-Request-Num-MuxCS (e.g., within a PRB).

Under a proposed scheme in accordance with the present disclosure, the PSFCH resources for request transmissions may be first indexed according to an ascending order of the PRB index, from the set of PRBs for request transmissions, and then according to an ascending order of the cyclic shift (pair) index from the $N_{CS}^{PSFCH}$ cyclic shift pairs. Alternatively, the PSFCH resources for request transmissions may be ordered firstly according to the cyclic shift (pair) index and then according to the PRB index. Under the proposed scheme, the requesting UE may determine an index of a PSFCH resource for a request transmission based on the IDs of UEs involved in the transmitting and/or receiving of the request as follows:

$$(Tx\_id + Rx\_id) \bmod R_{Request, PRB, CS}^{PSFCH}$$

Under a proposed scheme in accordance with the present disclosure, the requesting UE may determine a $m_0$ value for computing a value of cyclic shift α from a cyclic shift index corresponding to a PSFCH resource index and from $N_{CS}^{PSFCH}$ using Table 1 below.

TABLE 1

Set of cyclic shift (pairs)

| | $m_0$ | | | | | |
|---|---|---|---|---|---|---|
| $N_{CS}^{PSFCH}$ | Cyclic Shift (Pair) Index 0 | Cyclic Shift (Pair) Index 1 | Cyclic Shift (Pair) Index 2 | Cyclic Shift (Pair) Index 3 | Cyclic Shift (Pair) Index 4 | Cyclic Shift (Pair) Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

Moreover, the requesting UE may be (pre-)configured a $m_{CS}$ value for computing a value of cyclic shift α.

Under a proposed scheme in accordance with the present disclosure, the requesting UE may request one or more other UEs to provide inter-UE coordination information about one or more preferred resources for data transmission. Such request may be transmitted via a $1^{st}$ SCI signal and/or a $2^{nd}$ SCI signal in two-stage SCI signaling with or without an associated data channel. In such cases, one field in the SCI may be used to indicate that the message being transmitted is a request message to facilitate proper interpretation by the receiving UE. For instance, a first value (e.g., value "0") in a one-bit field may indicate that SCI format 2-C is used for providing inter-UE coordination information and a second value (e.g., value "1") in that one-bit field may indicate that SCI format 2-C is used for requesting inter-UE coordination information. Additionally, the requesting UE may be provided with a set of PRBs or resource pool for the request transmission. A starting PRB index for the request transmission within the set of PRBs or resource pool may be determined by the IDs of the UEs involved in the transmitting/receiving of the request as well as the number of PRBs in the resource set or the resource pool.

Illustrative Implementations

Figure 3:
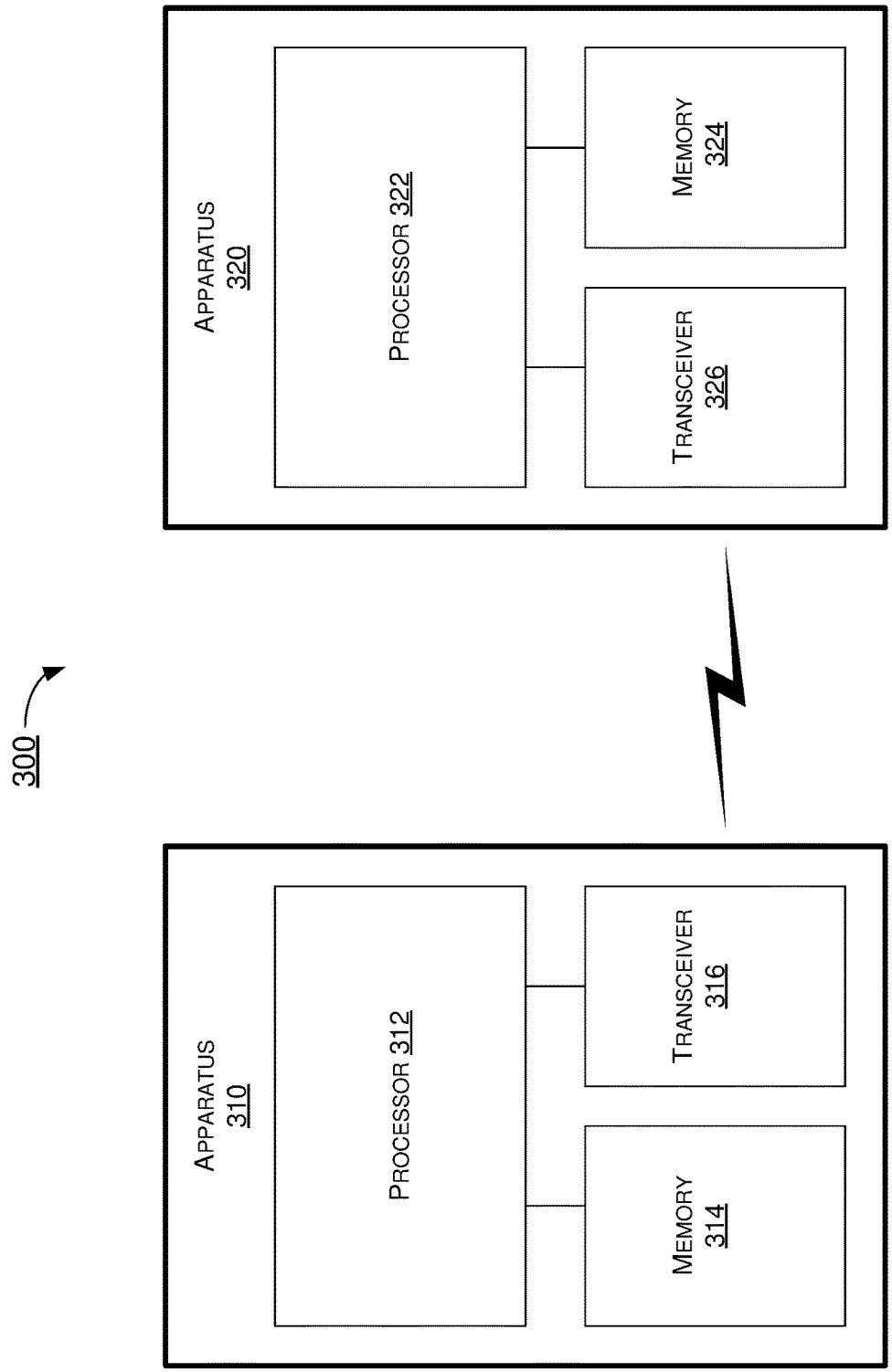
FIG. 3 is a block diagram of an example communication system in which various proposed schemes in accordance with an implementation of the present disclosure.

FIG. 3 illustrates an example communication system 300 having an example apparatus 310 and an example apparatus 320 in accordance with an implementation of the present disclosure. Each of apparatus 310 and apparatus 320 may perform various functions to implement schemes, techniques, processes and methods described herein pertaining to inter-UE coordination for enhancement of SL communications, including various schemes described herein.

Each of apparatus 310 and apparatus 320 may be a part of an electronic apparatus, which may be a UE such as a vehicle, a portable or mobile apparatus, a wearable apparatus, a wireless communication apparatus or a computing apparatus. For instance, each of apparatus 310 and apparatus 320 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT or NB-IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. Alternatively, each of apparatus 310 and apparatus 320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 310 and apparatus 320 may include at least some of those components shown in FIG. 3 such as a processor 312 and a processor 322, respectively. Each of apparatus 310 and apparatus 320 may further include one or more other components not pertinent to the proposed scheme of the present disclosure (e.g., internal power supply, display device and/or user interface device), and, thus, such component(s) of each of apparatus 310 and apparatus 320 are neither shown in FIG. 3 nor described below in the interest of simplicity and brevity.

In some implementations, at least one of apparatus 310 and apparatus 320 may be a part of an electronic apparatus, which may be a vehicle, a roadside unit (RSU), network node or base station (e.g., eNB, gNB or TRP), a small cell, a router or a gateway. For instance, at least one of apparatus 310 and apparatus 320 may be implemented in a vehicle in a V2V or V2X network, an eNodeB in an LTE, LTE-Advanced or LTE-Advanced Pro network or in a gNB in a 5G, NR, IoT or NB-IoT network. Alternatively, at least one of apparatus 310 and apparatus 320 may be implemented in the form of one or more IC chips such as, for example and without limitation, one or more single-core processors, one or more multi-core processors, one or more RISC processors, or one or more CISC processors.

In one aspect, each of processor 312 and processor 322 may be implemented in the form of one or more single-core processors, one or more multi-core processors, one or more RISC processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including inter-UE coordination for enhancement of SL communications in accordance with various implementations of the present disclosure.

In some implementations, apparatus 310 may also include a transceiver 316, as a communication device, coupled to processor 312 and capable of wirelessly transmitting and receiving data. In some implementations, apparatus 310 may further include a memory 314 coupled to processor 312 and capable of being accessed by processor 312 and storing data therein. In some implementations, apparatus 320 may also include a transceiver 326, as a communication device, coupled to processor 322 and capable of wirelessly transmitting and receiving data. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

To aid better understanding, the following description of the operations, functionalities and capabilities of each of apparatus 310 and apparatus 320 is provided in the context of a NR V2X communication environment in which apparatus 310 is implemented in or as a wireless communication device, a communication apparatus or a first UE (e.g., UE-B as a requesting or assisted UE in communication environment 100) and apparatus 320 as a wireless communication device, a communication apparatus or a second UE (e.g., UE-A as a peer or receiving or assisting UE in communication environment 100).

Under various proposed schemes pertaining to inter-UE coordination for enhancement of SL communications in accordance with the present disclosure, processor 312 of apparatus 310 as a first UE may transmit, via transceiver 316, a first message via SCI signaling to apparatus 320 as a second UE. Moreover, processor 312 may receive, via transceiver 316, a second message from the second UE responsive to transmitting the first message. Furthermore, processor 312 may transmit, via transceiver 316, data using a resource derived based on a preferred resource indicated by inter-UE coordination information in the second message. Moreover, processor 312 of apparatus 310 as a first UE may transmit, via transceiver 316, a first message via MAC-CE or PSFCH-type to apparatus 320 as a second UE. Processor 312 may receive, via transceiver 316, a second message via PSFCH-type, SCI signaling or MAC-CE from the second UE responsive to transmitting the first message.

In some implementations, in transmitting the first message via SCI signaling, processor 312 may transmit the first message via a second SCI signal in two-stage SCI signaling. In some implementations, a field in the second SCI signal may indicate that the first message is a request message requesting for the inter-UE coordination information that indicates one or more preferred resources usable by the first UE to transmit the data. For instance, a pre-defined value in the field may indicate that a SCI format 2-C is used to request for the inter-UE coordination information.

In some implementations, a priority level of the first message may be pre-configured or pre-defined.

In some implementations, processor 312 may perform one or more additional operations. For instance, processor 312 may determine a priority level of the first message based on a priority of a packet to be transmitted over the resource as indicated in the second message.

In some implementations, processor 312 may perform one or more additional other operations. For instance, processor 312 may receive from a higher layer an indication that disables transmission of any signal to request for the inter-UE coordination information.

Under various proposed schemes pertaining to inter-UE coordination for enhancement of SL communications in accordance with the present disclosure, processor 322 of apparatus 320 as a second UE may receive, via transceiver 326, a first message via SCI signaling from apparatus 310 as a first UE. Moreover, processor 322 may transmit, via transceiver 326, a second message to the first UE responsive to receiving the first message, with the second message including inter-UE coordination information indicating a preferred resource usable by the first UE to transmit data.

In some implementations, in receiving the first message via SCI signaling, processor 322 may receive the first message via a second SCI signal in two-stage SCI signaling. In some implementations, a field in the second SCI signal may indicate that the first message is a request message requesting for the inter-UE coordination information that indicates one or more preferred resources usable by the first UE to transmit the data. For instance, a pre-defined value in the field may indicate that a SCI format 2-C is used to request for the inter-UE coordination information.

In some implementations, in transmitting the second message, processor 322 may transmit the second message via a second SCI signal. In some implementations, a field in the second SCI signal may indicate that the second message is a response message providing the inter-UE coordination information.

In some implementations, a priority level of the first message may be pre-configured or pre-defined.

Illustrative Processes

Figure 4:
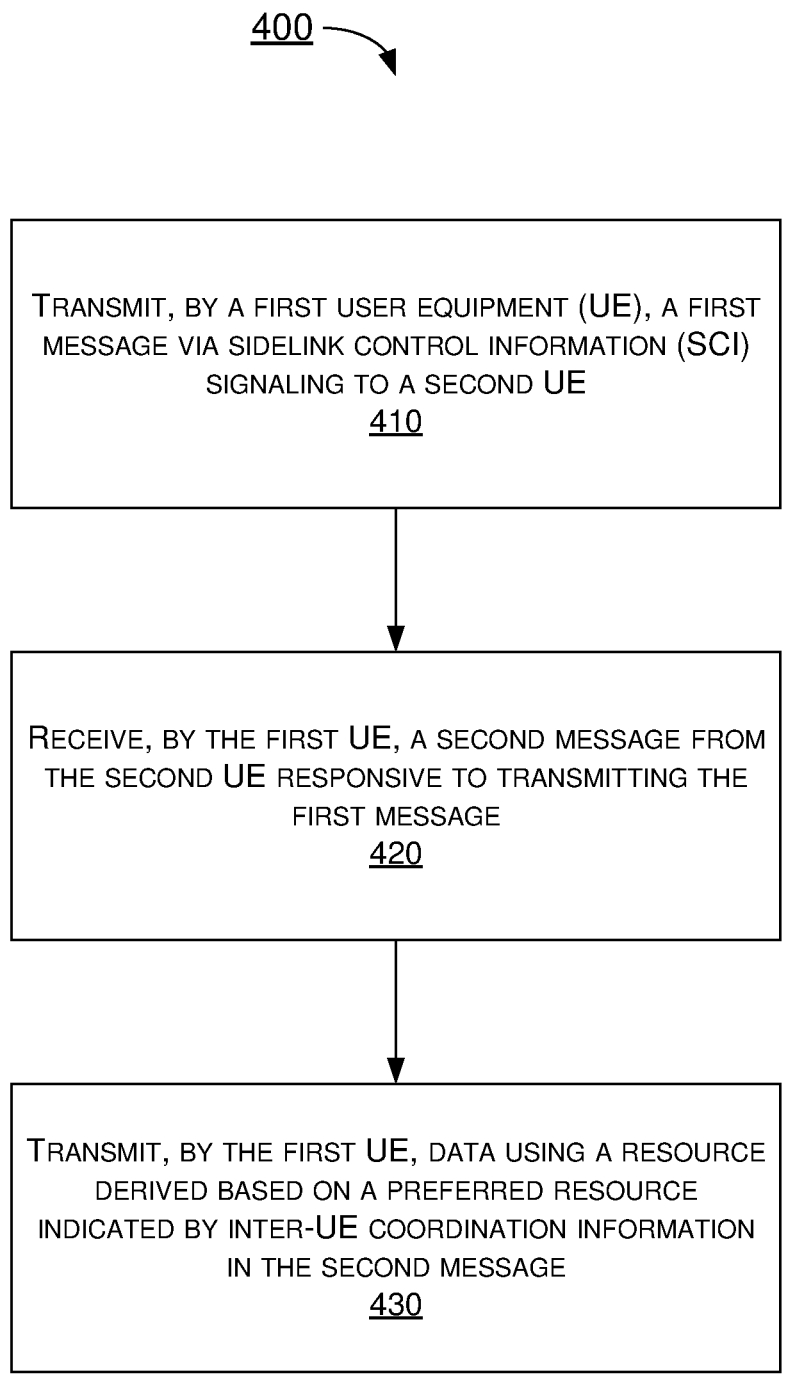
FIG. 4 is a flowchart of an example process under a proposed scheme in accordance with an implementation of the present disclosure.

FIG. 4 illustrates an example process 400 in accordance with an implementation of the present disclosure. Process 400 may be an example implementation of the proposed schemes described above with respect to inter-UE coordination for enhancement of SL communications in accordance with the present disclosure. Process 400 may represent an aspect of implementation of features of apparatus 310 and apparatus 320. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 310, apparatus 320 and/or any suitable wireless communication device, UE, RUS, base station or machine type devices. Solely for illustrative purposes and without limitation, process 400 is described below in the context of apparatus 310 as a first UE (e.g., UE 110 or UE-B as a requesting or assisted UE in communication environment 100) and apparatus 320 as a second UE (e.g., UE 120 or UE-A as a peer or receiving or assisting UE in communication environment 100). Process 400 may begin at block 410.

At block 410, process 400 may involve processor 312 of apparatus 310 as a first UE transmitting, via transceiver 316, a first message via SCI signaling to apparatus 320 as a second UE. Process 400 may proceed from block 410 to block 420.

At block 420, process 400 may involve processor 312 receiving, via transceiver 316, a second message from the second UE responsive to transmitting the first message. Process 400 may proceed from block 420 to block 430.

At block 430, process 400 may involve processor 312 transmitting, via transceiver 316, data using a resource derived based on a preferred resource indicated by inter-UE coordination information in the second message.

In some implementations, in transmitting the first message via SCI signaling, process 400 may involve processor 312 transmitting the first message via a second SCI signal in two-stage SCI signaling. In some implementations, a field in the second SCI signal may indicate that the first message is a request message requesting for the inter-UE coordination information that indicates one or more preferred resources usable by the first UE to transmit the data. For instance, a pre-defined value in the field may indicate that a SCI format 2-C is used to request for the inter-UE coordination information.

In some implementations, a priority level of the first message may be pre-configured or pre-defined.

In some implementations, process 400 may involve processor 312 performing one or more additional operations. For instance, process 400 may involve processor 312 determining a priority level of the first message based on a priority of a packet to be transmitted over the resource as indicated in the second message.

In some implementations, process 400 may involve processor 312 performing one or more additional other operations. For instance, process 400 may involve processor 312 receiving from a higher layer an indication that disables transmission of any signal to request for the inter-UE coordination information.

Figure 5:
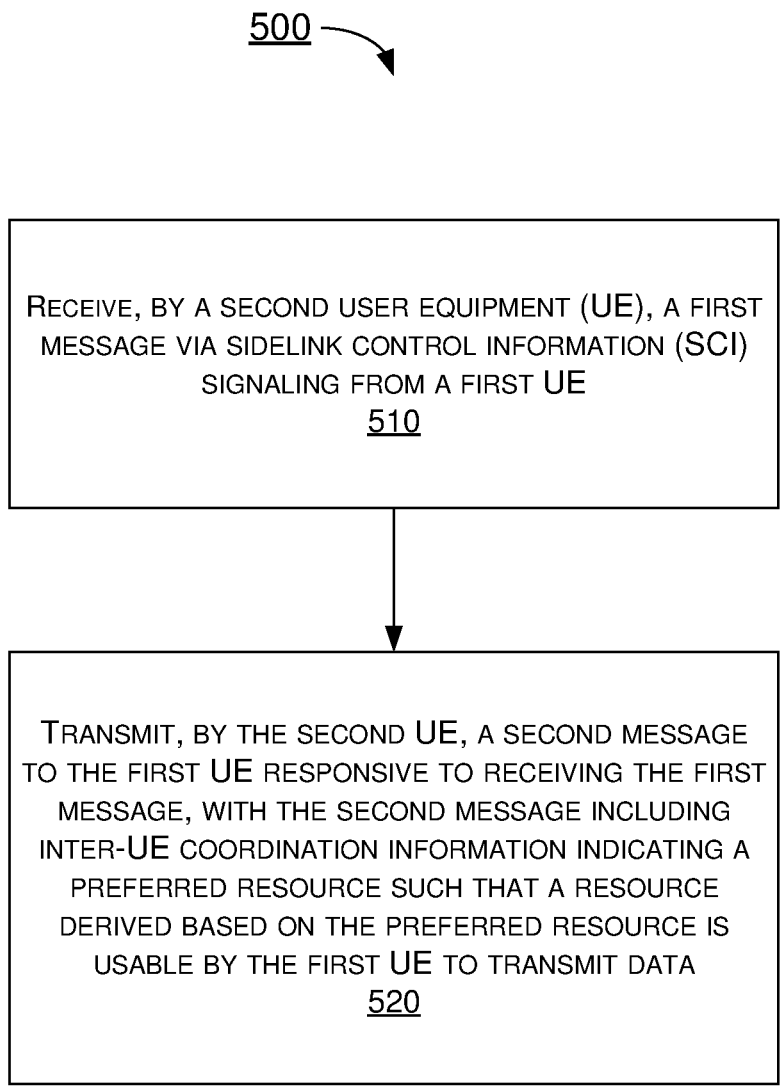
FIG. 5 is a flowchart of an example process under a proposed scheme in accordance with an implementation of the present disclosure.

FIG. 5 illustrates an example process 500 in accordance with an implementation of the present disclosure. Process 500 may be an example implementation of the proposed schemes described above with respect to inter-UE coordination for enhancement of SL communications in accordance with the present disclosure. Process 500 may represent an aspect of implementation of features of apparatus 310 and apparatus 320. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 310, apparatus 320 and/or any suitable wireless communication device, UE, roadside unit (RUS), base station or machine type devices. Solely for illustrative purposes and without limitation, process 500 is described below in the context of apparatus 310 as a first UE (e.g., UE 110 or UE-B as a requesting or assisted UE in communication environment 100) and apparatus 320 as a second UE (e.g., UE 120 or UE-A as a peer or receiving or assisting UE in communication environment 100). Process 500 may begin at block 510.

At block 510, process 500 may involve processor 322 of apparatus 320 as a second UE receiving, via transceiver 326, a first message via SCI signaling from apparatus 310 as a first UE. Process 500 may proceed from block 510 to block 520.

At block 520, process 500 may involve processor 322 transmitting, via transceiver 326, a second message to the first UE responsive to receiving the first message, with the second message including inter-UE coordination information indicating a preferred resource, and wherein a resource derived based on the preferred resource is usable by the first UE to transmit data.

In some implementations, in receiving the first message via SCI signaling, process 500 may involve processor 322 receiving the first message via a second SCI signal in two-stage SCI signaling. In some implementations, a field in the second SCI signal may indicate that the first message is a request message requesting for the inter-UE coordination information that indicates one or more preferred resources usable by the first UE to transmit the data. For instance, a pre-defined value in the field may indicate that a SCI format 2-C is used to request for the inter-UE coordination information.

In some implementations, in transmitting the second message, process 500 may involve processor 322 transmitting the second message via a second SCI signal. In some implementations, a field in the second SCI signal may indicate that the second message is a response message providing the inter-UE coordination information.

In some implementations, a priority level of the first message may be pre-configured or pre-defined.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc". is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc". is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a first user equipment (UE), a first message via sidelink control information (SCI) signaling to a second UE;
   receiving, by the first UE, a second message from the second UE responsive to transmitting the first message; and
   transmitting, by the first UE, data using a resource derived based on a preferred resource indicated by inter-UE coordination information in the second message,
   wherein the transmitting of the first message via SCI signaling comprises transmitting the first message via a second SCI signal in two-stage SCI signaling,
   wherein a field in the second SCI signal indicates that the first message is a request message requesting for the inter-UE coordination information that indicates one or more preferred resources usable by the first UE to transmit the data,
   wherein a first value in the field indicates that a SCI format 2-C is used to request for the inter-UE coordination information,
   wherein a second value in the field indicates that the SCI format 2-C is used to provide the inter-UE coordination information, and
   wherein the transmitting of the first message comprises transmitting the request message with a number of transmissions, with a maximum number of the transmissions being configured per bandwidth part (BWP) or per resource pool.

2. The method of claim 1, wherein a priority level of the first message is pre-configured or pre-defined.

3. The method of claim 1, further comprising:
   determining, by the first UE, a priority level of the first message based on a priority of a packet to be transmitted over the resource as indicated in the second message.

4. The method of claim 1, further comprising:
   receiving from a higher layer an indication that disables transmission of any signal to request for the inter-UE coordination information.

5. The method of claim 1, wherein resources used in the transmissions of the first message are changed from one transmission to another transmission based on a function of a quality of the transmissions or a predefined pattern.

6. A method, comprising:
   receiving, by a second user equipment (UE), a first message via sidelink control information (SCI) signaling from a first UE; and
   transmitting, by the second UE, a second message to the first UE responsive to receiving the first message,
   wherein the second message includes inter-UE coordination information indicating a preferred resource, and
   wherein a resource derived based on the preferred resource is usable by the first UE to transmit data,
   wherein the receiving of the first message via SCI signaling comprises receiving the first message via a second SCI signal in two-stage SCI signaling,
   wherein a field in the second SCI signal indicates that the first message is a request message requesting for the inter-UE coordination information that indicates one or more preferred resources usable by the first UE to transmit the data,
   wherein a first value in the field indicates that a SCI format 2-C is used to request for the inter-UE coordination information,
   wherein a second value in the field indicates that the SCI format 2-C is used to provide the inter-UE coordination information, and
   wherein the receiving of the first message comprises receiving the request message with a number of transmissions from the first UE, with a maximum number of the transmissions being configured per bandwidth part (BWP) or per resource pool.

7. The method of claim 6, wherein the transmitting of the second message comprises transmitting the second message via a second SCI signal, and wherein a field in the second SCI signal indicates that the second message is a response message providing the inter-UE coordination information.

8. The method of claim 6, wherein a priority level of the first message is pre-configured or pre-defined.

9. The method of claim 6, wherein resources used in the transmissions of the first message from the first UE are changed from one transmission to another transmission based on a function of a quality of the transmissions or a predefined pattern.

10. An apparatus implementable in a first user equipment (UE), comprising:
    a transceiver configured to communicate wirelessly; and
    a processor coupled to the transceiver and configured to perform operations comprising:
        transmitting, via the transceiver, a first message via sidelink control information (SCI) signaling to a second UE;
        receiving, via the transceiver, a second message from the second UE responsive to transmitting the first message; and transmitting, via the transceiver, data using a resource derived based on a preferred resource indicated by inter-UE coordination information in the second message, wherein the transmitting of the first message via SCI signaling comprises transmitting the first message via a second SCI signal in two-stage SCI signaling, wherein a field in the second SCI signal indicates that the first message is a request message requesting for the inter-UE coordination information that indicates one or more preferred resources usable by the first UE to transmit the data, wherein a first value in the field indicates that a SCI format 2-C is used to request for the inter-UE coordination information, wherein a second value in the field indicates that the SCI format 2-C is used to provide the inter-UE coordination information, and wherein the transmitting of the first message comprises transmitting the request message with a number of transmissions, with a maximum number of the transmissions being configured per bandwidth part (BWP) or per resource pool.

11. The apparatus of claim 10, wherein a priority level of the first message is pre-configured or pre-defined.

12. The apparatus of claim 10, wherein the processor is further configured to determine a priority level of the first message based on a priority of a packet to be transmitted over the resource as indicated in the second message.

13. The apparatus of claim 10, wherein the processor is further configured to receive from a higher layer an indication that disables transmission of any signal to request for the inter-UE coordination information.

14. The apparatus of claim 10, wherein resources used in the transmissions of the first message are changed from one transmission to another transmission based on a function of a quality of the transmissions or a predefined pattern.

* * * * *